United States Patent [19]

Lewis

[11] 3,748,518

[45] July 24, 1973

[54] FLUORESCENT LAMP HAVING TITANIA-DOPED GLASS ENVELOPE WITH TRANSPARENT BUFFER FILM OF TITANIA

[75] Inventor: Daniel W. Lewis, Pittsburgh, Pa.

[73] Assignee: Westinghouse Electric Corporation, Pittsburgh, Pa.

[22] Filed: June 14, 1972

[21] Appl. No.: 262,873

[52] U.S. Cl.............. 313/109, 313/112, 313/220, 313/221
[51] Int. Cl.................. H01j 61/30, H01j 61/35
[58] Field of Search.............. 313/109, 220, 221, 313/112; 106/52

[56] References Cited
UNITED STATES PATENTS

| | | | |
|---|---|---|---|
| 2,864,966 | 12/1958 | Burns | 313/109 |
| 3,581,137 | 5/1971 | Arnott et al. | 313/112 X |
| 3,581,139 | 5/1971 | Haft et al. | 313/109 |
| 3,599,029 | 8/1971 | Martyny | 313/109 |

Primary Examiner—Palmer C. Demeo
Attorney—A. T. Stratton, D. S. Buleza et al.

[57] ABSTRACT

The light output and lumen maintenance of a fluorescent lamp having a bulb composed of soda-lime silicate glass are enhanced by doping the glass with a controlled amount of titania and vapor-depositing a thin transparent film of $TiO_2$ on the inner surface of the bulb at the phosphor-glass interface. The titania film has a thickness of from 0.01 to 0.02 micron and serves as a "buffer layer" which, reflects ultraviolet radiation and, in conjunction with the titania in the glass, thus inhibits the solarization of the bulb and deleterious chemical reactions at the bulb surface. Optimum lamp performance is thus obtained with a minimum amount of titania.

10 Claims, 2 Drawing Figures

3,748,518

FLUORESCENT LAMP HAVING TITANIA-DOPED GLASS ENVELOPE WITH TRANSPARENT BUFFER FILM OF TITANIA

BACKGROUND OF THE INVENTION

1. Field of the Invention

This invention relates to electric discharge lamps and has particular reference to an improved fluorescent lamp and envelope component for such a lamp.

2. Description of the Prior Art

As is well known in the art, the light output and lumen maintenance of a fluorescent lamp progressively decrease during the useful life of the lamp. Among the factors responsible for this undesirable lamp characteristic are the progressive darkening or solarization of the glass bulb by the impinging ultraviolet radiations and the formation of localized deposits and discolorations on the inner surface of the bulb resulting from the amalgamation of mercury and the alkali constituents of the bulb glass. It is also believed that the alkali constituents of the bulb glass, especially sodium and sodium ions, chemically interact with the phosphor coating and impair its ability to convert the ultraviolet radiations into visible radiation.

A marked decrease in the solarization effect has been achieved by adding small amounts of $TiO_2$ or $MoO_3$ to the soda-lime silicate glass from which the envelopes of fluorescent lamps are customarily made. An electric lamp having a photoresistant envelope that is fabricated from such a modified soda-lime silicate glass is disclosed in U.S. Pat. No. 3,581,137 issued May 25, 1971 to Edward G. F. Arnott et al. A fluorescent lamp having a Titania-doped soda-lime silicate glass envelope and a reduced amount of phosphor in the fluorescent coating is disclosed in U.S. Pat. No. 3,581,139 issued May 25, 1971 to Harry H. Haft et al.

A fluorescent lamp having an envelope made from lime glass or lead glass that is rendered UV-absorbing by zinc oxide, titanium oxide or cerium oxide that is added to the glass or coated onto the envelope's inner surface is disclosed in U.S. Pat. No. 2,774,903 issued to L. Burns Dec. 18, 1956.

A fluorescent lamp having a barrier layer of $TiO_2$ on the inner surface of a soda-lime glass envelope for preventing the sodium constituents of the glass from reacting with the mercury and producing a discoloring amalgam is disclosed in U.S. Pat. No. 3,141,990 issued July 21, 1964 to J. G. Ray. In accordance with the teachings of this patent, the titania barrier layer has a thickness from 0.0005 to 0.001 inch (12.7 to 25.4 microns).

A fluorescent lamp having a much thinner barrier layer of titanium dioxide or zirconium dioxide (0.02 to 0.2 micron thick) is disclosed in U.S. Pat. No. 3,377,494 issued Apr. 9, 1968 to R. W. Repsher. This patent also discloses the concept of using an exterior coating of such material to improve the lubricity of the bulb and thus prevent the coated bulbs from seizing and shaking the phosphor coating loose when they rub against one another during lamp manufacture.

In U.S. Pat. No. 3,379,917 issued Apr. 23, 1968 to Menelly there is disclosed the use of a thick layer of $TiO_2$ which contains a small amount of $Sb_2O_3$ and serves as an internal reflector for the lamp and U.S. Pat. No. 3,541,376 issued Nov. 17, 1970 to Sadoski et al. discloses a fluorescent lamp wherein a much thinner layer (less than 1 micron thick) of admixed $TiO_2$ and $Sb_2O_3$ is used on the inner surface of the bulb to serve as a UV filter and a starting aid.

According to a more recent development, a composite layer consisting of a thin layer of titania and a thicker layer of $Al_2O_3$ is employed as a transparent protective coating between the phosphor coating and inner surface of a fluorescent lamp envelope is disclosed in U.S. Pat. No. 3,599,029 issued Aug. 10, 1971 to William C. Martyny. The alumina layer is from 1 to 10 microns thick and the titania layer has a thickness of from 0.002 to 0.02 micron and preferably 0.005 to 0.01 micron.

SUMMARY OF THE INVENTION

While each of the innovations disclosed in the aforementioned patents constitute an improvement in the fluorescent lamp art, a further improvement in the light output and lumen maintenance of such lamps would be highly desirable since this would increase lamp efficiency and reduce lighting costs to an even greater degree. This objective is obtained in accordance with the present invention by combining a titania-doped soda-lime silicate glass envelope with a thin transparent film of titania that is disposed on the inner surface of the bulb and thus serves as a "buffer layer" which shields the phosphor from the alkali constituents of the glass and prevents the mercury vapor from reacting with such constituents and forming a discoloring amalgam. The titania film is of such thickness (0.01 to 0.02 micron) that it also reflects ultraviolet radiations and thus prevents them from passing into the envelope and darkening it. The combined action of the titania film and the titania dopant in the bulb glass and the resulting reflection of UV radiations back into the phosphor coating produce a lumen increase equivalent to that achieved by using titania as a constituent of the bulb glass. Thus, a marked improvement in lamp performance is achieved by utilizing only a small fraction of the amount of titania that is used in the bulb glass and by incorporating this small additional amount of titania in a separate UV-reflecting and chemically-stablizing film on the bulb surface.

The titanating operation is performed in such a way that a transparent film of titania can be simultaneously formed on the bulb exterior, thus eliminating the bulb-siezing and phosphor-flaking problems.

BRIEF DESCRIPTION OF THE DRAWINGS

A better understanding of the invention will be obtained from the exemplary embodiments illustrated in the accompanying drawing, wherein.

DESCRIPTION OF THE PREFERRED EMBODIMENTS

Figure 1:
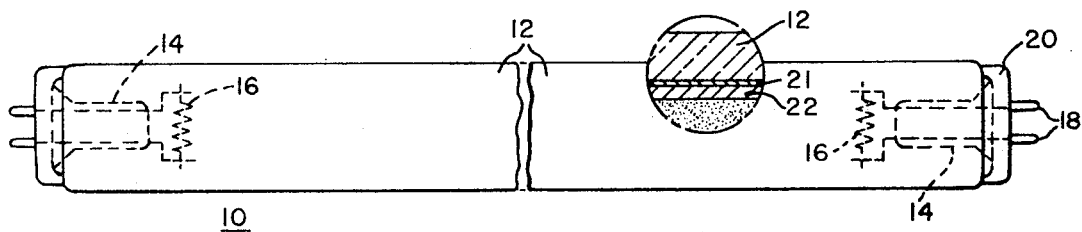
FIG. 1 is an elevational view of a fluorescent lamp embodying the present invention, a portion of the phosphor-coated envelope being shown in enlarged cross section for illustrative purposes.

In FIG. 1 there is shown a fluorescent lamp 10 having a tubular glass envelope 12 that contains the usual charge of mercury and ionizable starting gas and is sealed at each end by a conventional mount 14 consisting of the usual glass stem that supports a thermionic electrode 16 which is connected to the terminals 18 of a suitable base member 20 by a pair of lead wires. As a specific example, the envelope 12 is charged with a sufficient amount of mercury to provide a mercury-vapor pressure of about 6 microns during operation and the starting gas comprises neon or a mixture of neon and argon at a fill pressure of approximately 2 millimeters.

In accordance with this invention, the envelope 12 is composed of soda-lime silicate glass that contains a controlled amount of $TiO_2$ up to about 2 percent by weight, and preferably from about 0.5 to 1.5 percent by weight. The titania is incorporated as a constituent of the glass itself and thus renders the envelope 12 resistant to the solarization effects of the impinging ultraviolet radiations pursuant to the teachings of the aforementioned Arnott et al. U.S. Pat. No. 3,581,137. The iron oxide ($Fe_2O_3$) content of the glass is also maintained as low as possible consistent with the use of industrial-grade sands which do not have to be processed or cleansed in any way. The amount of $Fe_2O_3$ in the bulb glass is maintained at a value less than about 0.07 percent by weight and is preferably maintained within the range of about 0.03 to 0.05 percent by weight.

In addition to the titania-doped glass envelope 12, a thin transparent film 21 consisting essentially of $TiO_2$ is disposed on the inner surface of the envelope so that it is interposed between the envelope and the coating 22 of a suitable ultraviolet-responsive phosphor. The titania film 21 is continuous and adheres tightly to the bulb surface. It thus serves as a buffer layer at the phosphor-glass interface which, in addition to shielding the glass envelope from impinging ultraviolet radiations, physically isolates the glass surface from the mercury vapor within the lamp and also isolates the phosphor coating 22 from the alkali constituents of the glass which may be liberated when the lamp is energized and at its operating temperature. This is particularly important in the case of halophosphate type phosphor, such as calcium halophosphate phosphor that is activated by antimony and manganese, since such phosphors are adversely affected by sodium and sodium ions.

It has been found that the thickness of the titania film 21 must be maintained within a certain range in order to improve the lumen output and maintenance above the level obtained by merely doping the bulb glass with titania. Good results have been obtained with titania films having a thickness of from about 0.01 to 0.02 micron (100 A to 200 A). The preferred thickness range is from about 0.011 to 0.018 micron (110 A to 180 A) and optimum results have been obtained with films from about 0.012 to 0.16 micron (120 A to 160 A) thick.

As a specific example, the lumen output of a 40 watt "cool white" fluorescent lamp having 1.3 percent (by weight) titania in the bulb and a titania film 0.0125 micron thick (125 A) exhibited a gain of 50 lumens after 3000 hours burning in addition to the 50 lumen gain derived from the titania dopant in the bulb glass. The total gain in light output was thus 100 lumens (approximately 3 percent) and was maintained throughout the useful life of the lamp. The lamp contained approximately 5.5 grams of calcium halophosphate phosphor activated by antimony and manganese.

It was quite unexpected that the application of such very thin films of $TiO_2$ to the inner surfaces of the lamp envelopes, which already contained over 1 percent titania, produced a significant increase in the lumen output. This was especially so since the application of such intimately adhering films to the bulb surface increases the combined titania content of the bulb by only 0.002 to 0.004 percent by weight. The addition of the same minute quantity of titania to the glass composition itself would, on the other hand, have little or no effect on the performance of the lamp.

As will be apparent, determining the thickness of such thin titania films is rather difficult. The thickness data given above was obtained by analytically determining the quantity of titania removed from a known length (and thus a known area) of a coated bulb. The titania film was quantitatively dissolved off the bulb surface by heating the coated bulb in fuming sulfuric acid for 30 to 60 minutes and colorimetric methods were then used to determine the amount of $TiO_2$ in the acid solution. The film thickness was then calculated using the following relation:

Weight of $TiO_2$ on glass surface/(Density of $TiO_2$ × area of coverage) 32 $gm/(gm/cm^3 \times cm^2)$ = thickness in centimeters The thickness of the titania films was controlled by vapor-depositing the titania on the inner surface of the envelope 12. This was accomplished by entraining a volatile titanium compound, preferably tetraisopropyl titanate, in a carrier gas such as dry air and passing it through the envelope while the latter is at a temperature of from 400° to 500°C. Oxygen or a 50–50 mixture of oxygen and an inert gas such as argon can also be used as the carrier gas. In a typical application, each part of the bulb was maintained at the aforesaid temperature for about 1 minute in contact with the titanate vapors. However, this dwell time can be reduced by increasing the concentration of the titanate vapors in the carrier gas. The thickness of the deposited film can readily be controlled by those skilled in the art simply by varying the dwell time or the concentration of titanate vapor in the carrier gas, or both of these parameters.

In addition to shielding the phosphor coating 22 from the sodium and other alkali constituents of the bulb glass, the thin film 21 of titania reflects ultraviolet radiations impinging upon the inner surface of the envelope 12 and directs it back into the phosphor coating 22 where they have another opportunity to excite the phosphor particles and cause them to emit added visible light rays. This not only adds to the total light output of the lamp but prevents the reflected ultraviolet radiations from passing into the envelope 12. The progressive darkening and increase in the absorption coefficient of the bulb glass in the visible region due to the solarizing effects of such UV radiations are thus prevented. Tests conducted on glass samples provided with vapor-deposited titania films of the thicknesses referred to above (wherein a Model 14 Cary spectrophotometer fitted with an integrating sphere attachment was used to measure the reflection of 2537 A radiation by the titanated glass surfaces) have shown that the titania-coated glass has a reflectance in the UV region which is 3 to 5 times greater than that exhibited by untreated glass.

This characteristic of the titanated envelope 12 permits smaller amounts of $TiO_2$ (from 0.8 to 1.25 percent by weight) to be used in the bulb glass itself.

Figure 2:
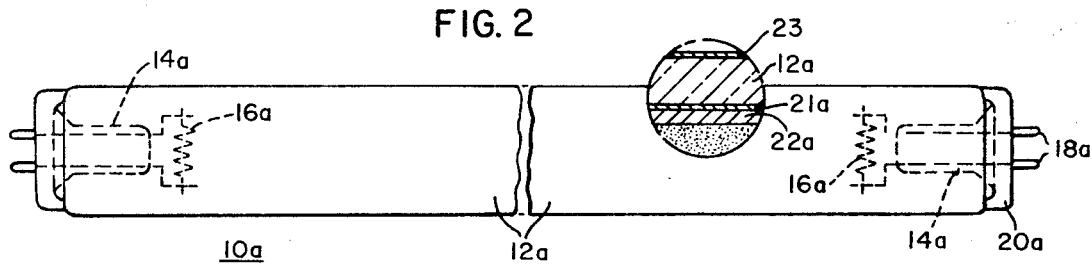
FIG. 2 is a similar view of an alternative lamp embodiment wherein the envelope is also provided with an outer coating of titania.

During the mass production of fluorescent lamps it is imperative that the individual lamps smoothly slip past one another when making contact in order to prevent the bulbs from chattering and dislodging the phosphor coating. When the latter occurs, clear spots appear in the phosphor coating which cannot be tolerated and the lamp must be scrapped. It has been found that this problem can be eliminated by depositing a thin film of titania on the outer surface of the envelope as well as its inner surface. This embodiment is shown in FIG. 2. As will be noted, the fluorescent lamp 10a has an envelope 12a that is provided with an interior thin film 21a of titania and an exterior film 23a of titania, both of which may be deposited simultaneously by heating the bulb to a suitable temperature and passing a volatile titanium compound over the heated bulb surfaces by means of a suitable carrier gas as previously described. Tests have shown that exterior titania films of the thicknesses specified above improve the scratch resistance and lubricity of the envelope to such a degree that a kilogram weight had to be applied to one of a pair of such envelopes before they would sieze and scratch one another. In contrast, clean bulbs of the same glass but without exterior titania films siezed and scratched when drawn past one another without any added weight.

I claim as my invention:

1. A low-pressure electric discharge lamp comprising;
   an envelope that encloses a predetermined amount of mercury and an ionizable starting gas and is composed of soda-lime silicate glass which contains up to about 2 percent by weight $TiO_2$,
   a pair of spaced electrodes sealed within said envelope adapted, when energized, to initiate and sustain an electric arc that generates both visible and ultraviolet radiations, and
   an adherent transparent film covering the inner surface of said envelope, said film consisting essentially of $TiO_2$ having a thickness of from about 0.01 to 0.02 micron.

2. The electric discharge lamp of claim 1 wherein;
   said envelope is of tubular configuration, and
   said film of $TiO_2$ is coated with a layer of ultraviolet-responsive phosphor and the lamp thus comprises a fluorescent lamp.

3. The fluorescent lamp of claim 2 wherein said lamp also has an adherent transparent film of $TiO_2$ on its outer surface.

4. The fluorescent lamp of claim 2 wherein the $TiO_2$ content of said glass envelope is within a range of from about 0.5 to 1.5 percent by weight and the glass contains less than about 0.07 percent by weight $Fe_2O_3$.

5. The fluorescent lamp of claim 2 wherein;
   said film of $TiO_2$ has a thickness of from about 0.011 to 0.018 micron, and
   said phosphor is of a type that is deleteriously affected by sodium and sodium ions.

6. The fluorescent lamp of claim 5 wherein;
   said phosphor comprises calcium halophosphate phosphor activated by antimony and manganese,
   the envelope glass contains from about 0.8 to 1.25 percent by weight $TiO_2$, and
   said film of $TiO_2$ has a thickness of from about 0.012 to 0.016 micron.

7. An envelope for a low-pressure electric discharge lamp comprising a tube of soda-lime silicate glass that contains from about 0.5 to 2 percent by weight $TiO_2$ and has an adherent transparent film of $TiO_2$ from 0.01 to 0.02 micron thick on its inner surface.

8. The lamp envelope of claim 7 wherein said glass tube also has an adherent transparent film of $TiO_2$ on its outer surface.

9. The lamp envelope of claim 7 wherein the $TiO_2$ content of the glass is between about 0.5 and 1.5 percent by weight and the film of $TiO_2$ has a thickness of from about 0.011 to 0.018 micron.

10. The lamp envelope of claim 7 wherein the film of $TiO_2$ has a thickness of from about 0.012 to 0.016 micron.

* * * * *